United States Patent [19]

Dewey et al.

[11] Patent Number: 4,482,261

[45] Date of Patent: Nov. 13, 1984

[54] METHOD FOR SIMULTANEOUS REFERENCE JUNCTION COMPENSATION OF A PLURALITY OF THERMOCOUPLES

[75] Inventors: Keith L. Dewey, Reynoldsburg; Eugene C. Varrasso, Heath, both of Ohio

[73] Assignee: Owens-Corning Fiberglas Corporation, Toledo, Ohio

[21] Appl. No.: 398,491

[22] Filed: Jul. 15, 1982

[51] Int. Cl.$^3$ .................... G01K 07/12; G01K 01/20
[52] U.S. Cl. .................... 374/181; 374/134; 374/170; 374/200; 361/263
[58] Field of Search .............. 374/181, 182, 165, 134; 136/222; 339/210 R, 263 R; 361/263, 383, 368; 364/178, 557

[56] References Cited

U.S. PATENT DOCUMENTS

| Re. 30,735 | 9/1981 | Ihlenfeldt | 374/181 |
|---|---|---|---|
| 2,471,011 | 5/1949 | Shapiro | 361/383 X |
| 2,690,462 | 9/1954 | Duckwall | 339/263 X |
| 3,100,397 | 8/1963 | Peltola | 374/181 |
| 3,382,478 | 5/1968 | Satterthwart | 339/210 M |
| 3,459,925 | 8/1969 | Goosey et al. | 374/181 |
| 3,648,523 | 3/1972 | Kemper et al. | 374/182 |
| 3,716,820 | 2/1973 | Deakin | 339/210 X |
| 4,020,443 | 4/1977 | LeRoy et al. | 374/165 X |
| 4,130,019 | 12/1978 | Nitschke | 374/181 X |
| 4,131,756 | 12/1978 | Smith | 374/181 |
| 4,147,061 | 4/1979 | Wester et al. | 374/110 |
| 4,221,923 | 9/1980 | Nagao et al. | 374/182 X |

OTHER PUBLICATIONS

"Heat and Thermodynamics", Mark W. Zemansky, pp. 19-21, 298-305, McGraw-Hill, 1957.
"Handbook of Chemistry and Physics", Robert C. Weast, Editor, p. E-87, Chemical Rubber Company, 47th Ed., 1966.
"Data Acquisition Components and Subsystems", pp. 8-49 through 8-54, pp. 8-55 through 8-58, published by Analog Devices, Inc., 1980.

Primary Examiner—Daniel M. Yasich
Attorney, Agent, or Firm—Ronald C. Hudgens; Patrick P. Pacella; Ronald E. Champion

[57] ABSTRACT

A method for simultaneous compensation of a plurality of thermocouple signals where the thermocouple leads are terminated to dissimilar metals without using individual ice junctions for compensation of each thermocouple signal is disclosed. The thermocouple leads are all terminated to individual connectors as reference junctions which are held at the same temperature by a block of metal which stabilizes thermally with its environment. The temperature of the metal block is measured by an integrated circuit temperature transducer which produces an analog electrical signal proportional to the temperature detected. This signal is digitized and a microprocessor calculates the temperature of the metal block which is placed on a first data bus. Additional microprocessors are connected to the individual thermocouple leads. These microprocessors convert the thermocouple signals into an uncorrected digital temperature. The microprocessors read the temperature of the metal block from the data bus, adds this temperature to the digitized thermocouple temperature signal, retransmits the corrected digitized temperature signal on a second data bus to a central computer, converts the corrected digital temperature signal to an analog signal and transmits this signal to external devices.

2 Claims, 9 Drawing Figures

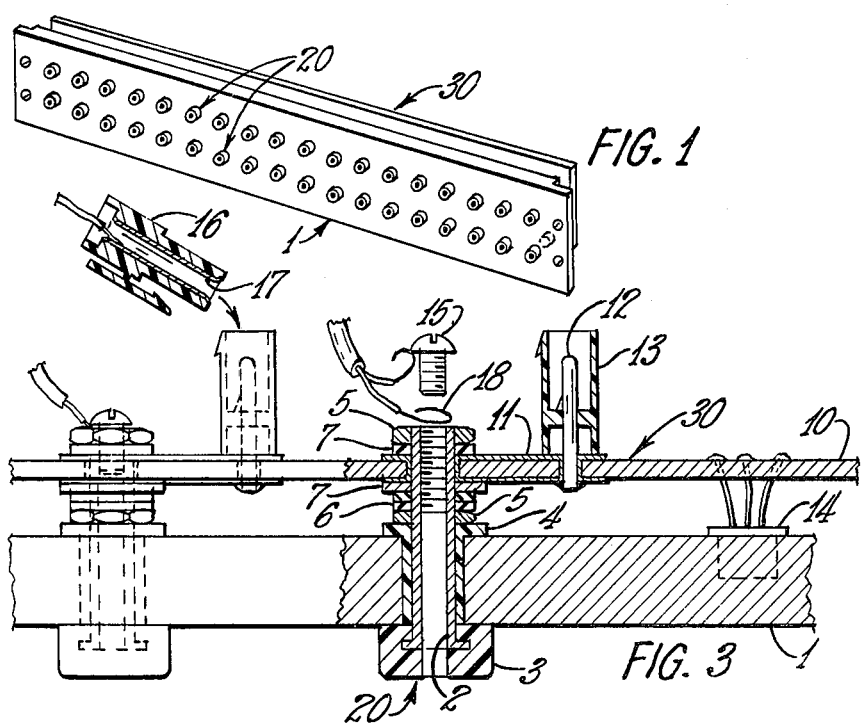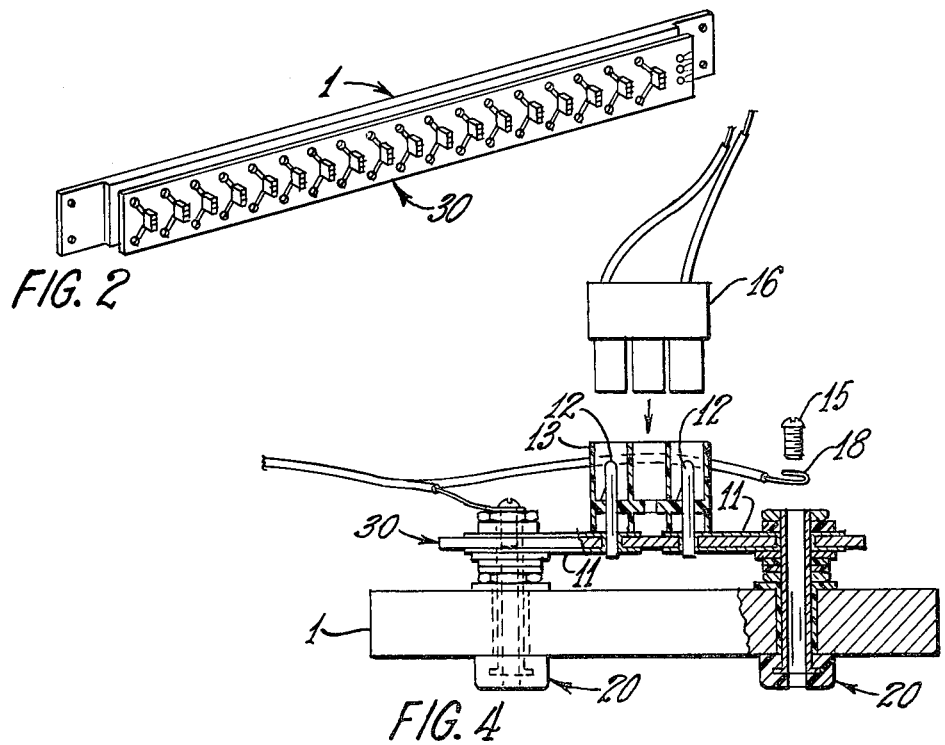

METHOD FOR SIMULTANEOUS REFERENCE JUNCTION COMPENSATION OF A PLURALITY OF THERMOCOUPLES

TECHNICAL FIELD

This invention relates to measuring temperatures by means of thermocouples and specifically to a method of reference junction compensation of a plurality of thermocouple signals simultaneously.

BACKGROUND ART

When two dissimilar metals are connected and that junction exposed to an elevated temperature, a thermal electromotive force is generated. This phenomenon is known as the Seebeck effect and is the basis of temperature measurements using thermocouples. When two similar metals are joined, no thermoelectric effect takes place. Thermocouple leads are, therefore, made from the same material from which the thermocouples are made, or are made from metals which minimize the thermoelectric effect. Eventually, in the circuit, however, connections must be made to copper, such as at the binding post of a potentiometer or other measuring device. Unfortunately, these connections form two new junctions which are themselves thermocouples. The error produced by these new thermocouple junctions can be eliminated by placing the copper to thermocouple lead junction in a bath of melting ice, as explained by Mark W. Zemansky in *Heat and Thermodynamics*. This keeps the two junctions at the same temperature and keeps that temperature constant. This cancels the thermoelectric effect of the new junction. If all additional terminations are copper to copper, no new thermal electromotive error is introduced. The electromotive force generated by the thermocouple is then measured with a potentiometer. The electromotive force generated by the thermocouple when an ice bath is used with the reference junction is represented by the equation:

$$E = At + \frac{Bt^2}{2} + \frac{Ct^3}{3}$$

where E equals electromotive force generated by the thermocouple; t equals temperature in degrees Celsius; A, B, C are constants dependent upon the materials used to fabricate the thermocouples. If the thermocouple to copper lead junctions are at some temperature other than the melting point of ice, then the above equation must be corrected by adding a term dependent upon the temperature of the junction, for example, $$E = E_c + E_r$$

where E equals electromotive force generated by thermocouple if an ice junction were used; $E_c$ equals correction factor; $E_r$ equals electromotive force actually measured. Once the electromotive force is determined, it is a simple matter to look up the temperature in a chart of electromotive force versus temperature which have been developed for various thermocouples and published in books such as the CRC *Handbook of Chemistry and Physics*.

Electronic devices such as a Thermocouple Cold Junction Compensator Model 2B56, manufactured by Analog Devices Incorporated, are available to replace an ice junction as a reference junction. Compensation is then made electrically. An isothermal block such as described in Applicant's co-pending application, Ser. No. 398,537, filed July 15, 1982, is used to terminate the thermocouple leads. An integrated circuit temperature transducer, such as a Model AD-590, manufactured by Analog Devices Incorporated, senses the temperature of the isothermal block. The thermocouple cold junction compensator, which has been pre-programmed for the type of thermocouple being utilized, accepts the signal from the temperature transducer and produces a millivoltage signal output which is representative of the amount of millivoltage produced by that specific type of thermocouple at the temperature of the isothermal block. This analog signal is added to the millivoltage signal produced by the thermocouple to give a corrected or compensated signal.

Two problems present themselves by using this type of system with a plurality of thermocouples. The first problem is the signal produced by a Model 2B56 is an analog signal dependent upon the type of thermocouple which is being compensated. In a complex process, different types of thermocouples may be used simultaneously. A separate Model 2B56 must be used for each type of thermocouple. The second problem also relates to the fact that the Model 2B56 produces an analog signal. Since the Model 2B56 produces an analog signal which must be added to the thermocouple signal, only one thermocouple at a time may be compensated. The Model 2B56 has provisions for switching sequentially or selectively to four individual thermocouples. This precludes simultaneous compensation of a plurality of thermocouples.

The present application overcomes these problems by digitizing the signal from the integrated circuit temperature transducer. The signal from the integrated circuit temperature transducer is converted into a digital signal which is representative of the temperature of the isothermal block. This signal is connected to microprocessors associated with each thermocouple lead by means of a communication bus. The compensation is then made digitally within the microprocessors.

DISCLOSURE OF THE INVENTION

This invention is a method for simultaneous reference junction compensation of a plurality of thermocouple signals. Thermocouple leads composed of the same material as the thermocouples are terminated at an isothermal block assembly. The isothermal block assembly is composed of connectors, recorder jacks, terminals and wiring circuitry all composed of copper. A mass of metal holds all of these components at the same temperature. The mass of metal of the isothermal block is electrically isolated from, but in thermal contact with, the copper components in the isothermal block. The connection of the thermocouple leads to the copper connectors of the isothermal block forms the reference junction of the thermocouple. All additional wiring in the thermocouple signal circuitry is composed of copper; hence, no additional thermoelectric effects occur.

The isothermal block assembly has an integrated circuit temperature transducer embedded in the mass of metal. This integrated circuit temperature transducer may be any type of electrical device which produces an electrical signal in response to a change in temperature.

A Model AD590, manufactured by Analog Devices Incorporated, will be described for purposes of illustration. The Model AD590 produces an electrical signal of one microampere per degree Kelvin (1 μA/°K.). This signal is converted to a voltage signal by passing it through a precision resistor. An Analog to Digital Converter (A/D) converts this signal from an analog signal to a digital signal. A microprocessor converts this signal into a digital signal representative of degrees Celsius by means of the microprocessor's Arithmetic Logic Unit (ALU). This digital Celsius temperature signal represents the temperature of the metal mass of the isothermal block. The microprocessor impresses this first signal or digital Celsius temperature signal on a first communication bus in a parallel digital format by means of a Peripheral Interface Adapter (PIA) associated with the microprocessor. The first data bus is connected to a central computer and to a plurality of microprocessors which are associated with each thermocouple lead pair.

Each thermocouple lead pair has a microprocessor with its associated hardware, an analog to digital converter and a digital to analog converter associated with that specific thermocouple lead pair. The function of these components in compensating the reference junction of the thermocouple will now be illustrated. The millivoltage signal for a specific thermocouple is led from the isothermal block to the input of an Analog to Digital Converter (A/D). This signal is the uncompensated millivoltage output of a thermocouple due to the Seebeck thermoelectric effect and is equal to the millivoltage produced by a thermocouple between temperature $t_2$, which is the temperature at the thermocouple, and temperature $t_1$, which is the temperature of the isothermal block. The temperatue $t_1$ has previously been determined by means of the integrated circuit temperature transducer embedded in the mass of metal of the isothermal block. The Analog to Digital Converter isolates and digitizes the signal. This becomes the second digital signal. This second digital signal is fed through a Peripheral Interface Adapter to a microprocessor.

The microprocessor is in communication with a central or host computer through a control bus. This control bus is used by the central computer to load programs, conversion factors and/or look up tables into the microprocessor. The first data bus is also connected to the microprocessor through a peripheral interface adapter.

One of two methods may be used by the microprocessor to correct the second digital signal to compensate for the temperature of the reference junction at the isothermal block. The first method is based upon the fact that the electromotive force generated by two dissimilar metals follows the equation:

$$E = At + \frac{Bt^2}{2} + \frac{Ct^3}{3}$$

where:
  E=electromotive force generated by the thermocouple.
  t=temperature in degrees Celsius.
  A, B, C=constants dependent upon the two metals used on the thermocouple construction.

The central computer is given the type of metals used in the thermocouples which are associated with the microprocessor. The central computer then loads the constant A, B and C into the microprocessor memory. The microprocessor can then by use of its arithmetic logic unit calculate temperature given the electromotive force or calculate the electromotive force given the temperature. The microprocessor reads the first digital signal from the first data bus. This is the temperature in degrees Celsius of the mass of metal of the isothermal block, $t_1$. The microprocessor converts this signal by means of the equation and the arithmetic logic unit into a digital millivoltage equal to the millivoltage which would be produced by a thermocouple at a temperature of $t_1$ which has its reference junction at zero degrees Celsius or $t_0$. This millivoltage signal is added to the second digital signal which is the digitized millivoltage signal produced by the thermocouple at temperature $t_2$ and its reference junction at temperature $t_1$. This added millivoltage signal is what a thermocouple at temperature $t_2$ would produce if its reference junction were at zero degrees Celsius or $t_0$. This signal is then converted by the arithmetic logic unit into a digitized temperature or third digital signal which is the temperature in degrees Celsius of the thermocouple tip compensated for the temperature of the reference junction.

The second method which the microprocessor may use to correct the second digital signal to compensate for the temperature of the isothermal block involves using look-up or conversion tables. The central computer is manually informed of the type of thermocouple which is connected to the microprocessor. The central computer then feeds a table of millivoltage versus temperature to the microprocessor by means of the control bus. The microprocessor stores this look-up table in its associated memory. The microprocessor reads the second digital signal, which is the digitized millivoltage signal, from the peripheral interface device. The microprocessor reads the first digitized signal from the first data bus. The first digital signal is the temperature of the isothermal block, $t_1$. The microprocessor begins looking at temperature $t_1$ for a change in millivoltage E which corresponds to the millivoltage digital signal. This E millivoltage is:

$$E = Et_2 - Et_1$$

where:
  $Et_2$=millivoltage produced by a thermocouple at temperature of $t_2$ with its reference junction at 0° Celsius, $t_0$.
  $Et_1$=millivoltage produced by a thermocouple at temperature of $t_1$ with its reference junction at 0° Celsius, $t_0$.
  E=second digital signal.

When the microprocessor determines this voltage by approximation and interpolation methods, it converts the temperature $t_2$ into a digital signal, the third digital signal, which is the temperature in degrees Celsius of the thermocouple tip compensated for the temperature of the reference junction.

The two methods which the microprocessor may use to arrive at the third digital signal are equivalent and depend merely on programming ease and speed of operation. Once the microprocessor determines this third digital signal, it is transmitted to a peripheral interface adapter which feeds the digital signal onto a second data bus. This second data bus is connected to the central computer and to all other thermocouple microprocessors. The signal is also fed to a Digital to Analog Converter (A/D) where it is converted to an analog signal for use in recording devices and control units.

Several benefits are to be derived by this method of reference junction compensation. Only one device is needed to measure the temperature of the isothermal block. This device, after signal conditioning as described above, is the basis for compensation for all thermocouples which terminate at this isothermal block. The signal representing the temperature of the isothermal block being digitized and placed on a data bus is not affected by the load matching, amplification, and switching problems associated with analog compensation system.

Thermocouple types may be switched or changed at the microprocessor with no additional hardware changes. The central computer merely re-loads into the microprocessor either the constants of method one or look-up table of method two for that particular type of thermocouple. Similarly, several different types of thermocouples may be terminated at the isothermal block. Since each thermocouple is associated with an individual microprocessor, that microprocessor corrects for that particular type of thermocouple. The integrated circuit temperature transducer embedded in the metal mass of the isothermal block need not be changed, modified or re-calibrated merely because different types of thermocouples are being compensated.

BRIEF DESCRIPTION OF THE DRAWINGS

FIG. 1 is a front view of an isothermal block assembly.

FIG. 2 is a back view of an isothermal block assembly.

FIG. 3 is a cross section of an isothermal block assembly running longitudinally.

FIG. 4 is a cross section of an isothermal block assembly running vertically.

BEST MODE OF CARRYING OUT THE INVENTION

Figure 5:
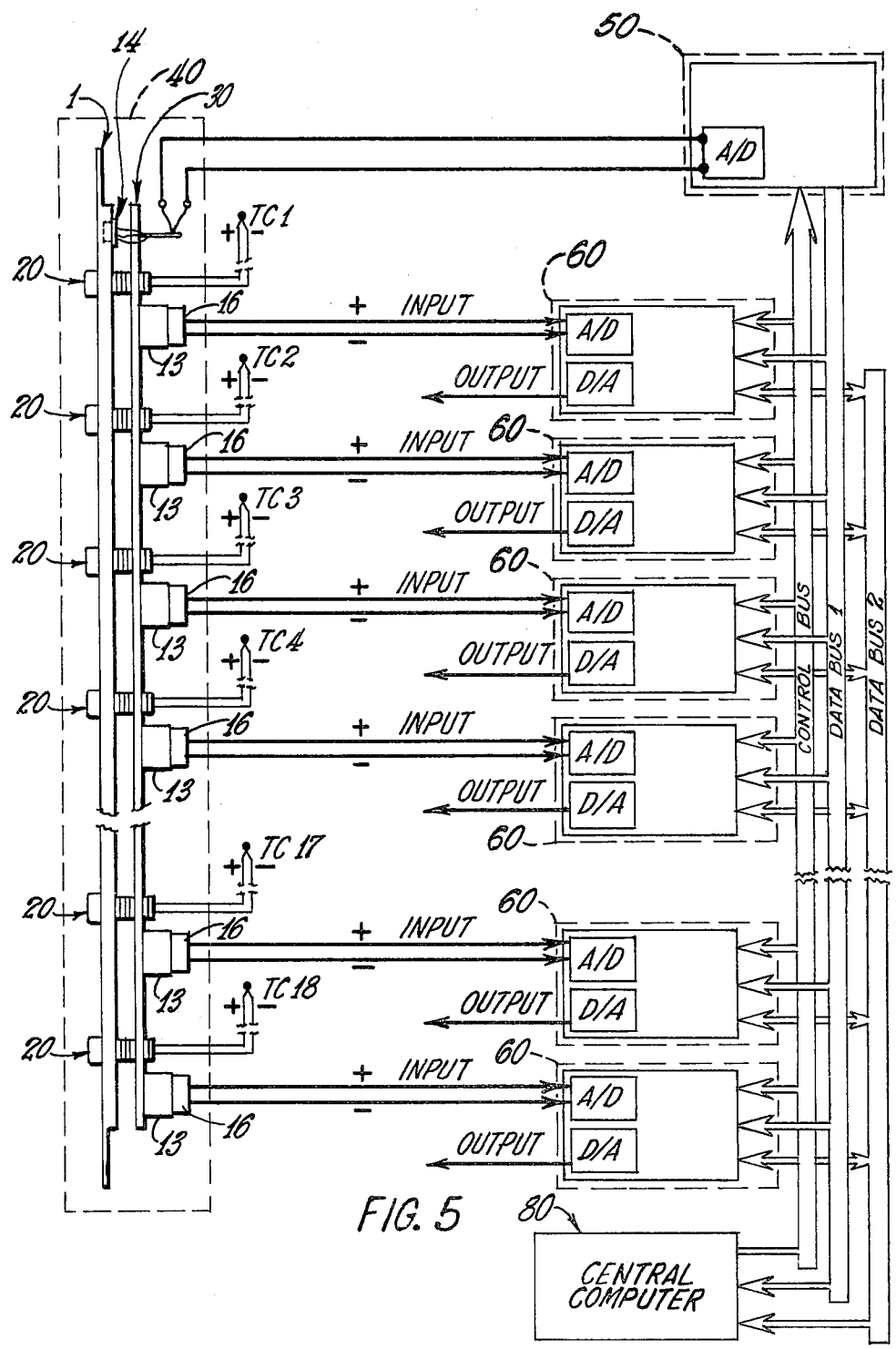
FIG. 5 is a view of the hardware used in the method of reference junction compensation of a plurality of thermocouples.

This invention compensates the signal produced by a thermocouple for the temperature of a reference junction. The method can simultaneously compensate a plurality of thermocouples which are terminated to an isothermal block. The connection of the thermocouple leads to the connectors of the isothermal block form the reference junction for that particular thermocouple.

An example of an isothermal block is disclosed in Applicant's co-pending application, Ser. No. 398,537, filed July 15, 1982. FIGS. 1 and 2 show a front and rear view of an isothermal block. FIGS. 3 and 4 show detailed construction. The construction and operation of an isothermal block which can be used for this method of compensation will now be described.

A metallic faceplate 1, preferably aluminum, has vertical pairs of holes spaced longitudinally down its length as shown in FIG. 1. Each pair of holes corresponds to the positive and negative leads of a thermocouple. In the preferred embodiment, the isothermal panel assembly is used to terminate 18 thermocouples. There would be, therefore, 18 pairs, or 36 individual holes spaced in faceplate 1. The faceplate 1 is machined to fit into a standard equipment rack (not shown) with appropriate holes for fastening as shown in FIGS. 1 and 2. The mass of the faceplate 1 is such that it will come to thermal equilibrium with the ambient air and hold all termination points at the same temperature as will be seen from the following discussion.

The holes in the faceplate 1 receive jack assemblies 20 which consist of a copper tubular member 2 with a plastic tip 3 molded on one end. The plastic tip 3 has a flat backside designed to fit flush with faceplate 1 and has a hole molded into the front which is concentric with and the same diameter as the inside of copper tubular member 2. The inside diameter of the copper tubular member 2 is sized to accept an equipment or recorder plug (not shown). The end of the copper tubular member 2 opposite the plastic tip 3 has external and internal threads formed thereon.

An insulating sleeve 4 having an inside diameter equal to the outside diameter of the copper tubular member 2 of jack assembly 20 and an outside diameter equal to the inside diameter of the holes in the faceplate 1 has a flange molded integral with one end. The insulating sleeve 4 is inserted into the hole in the faceplate 1 from the backside. The tubular member 2 of jack assembly 20 is placed through the insulating sleeve 4 from the front side of faceplate 1. A copper nut 5 is placed over the external threads of copper tubular member 2 and tightened to hold the jack assembly 20 firmly to the faceplate 1. The jack assembly 20 is thus completely electrically isolated from the faceplate 1 by the plastic tip 3 of jack assembly 20 and the flange and body of insulating sleeve 4.

A printed circuit board 30 is fabricated of a non-electrically conductive substrate 10 coated with conductive copper circuitry 11. Pairs of holes are spaced longitudinally through the non-conductive substrate 10 corresponding to the hole spacing in faceplate 1. The diameter of the holes are slightly greater than the outside diameter of the copper tubular member 2 of jack assembly 20. Smaller holes slightly larger than the copper terminals 12 are spaced inboard toward the center of the substrate 20 to accept the terminals 12. The copper conductive elements 11 are printed through the holes and on both sides of substrate 10 to electrically connect the hole which will receive the jack assembly 20 to the hole which will accept the terminal 12. In this manner, any signal impressed on one jack assembly 20 will be impressed on only one terminal 12. The terminal 12 is pressed into its proper hole and is soldered to the copper conductive element 11 of printed circuit board 30. A female insulator block 13 is positioned over a pair of terminals 20 and is held in place by barbs on the body of terminal 12 which engage a molded rib on the insulator block 13. The terminal 12 and insulator block 13 are designed to accept a male insulator block 16 holding female connector 17 to which are soldered leads for ultimate connection to external devices.

To complete the assembly, insulating washers 6 are placed over the tubular member 2 of the jack assembly 20 to act as insulators and spacers. A copper washer 7 is then placed over the tubular member 2. The printed circuit board assembly 30 is placed over the jack assemblies 20 which are held in place on faceplate 1. Copper washers 7 are then placed over the tubular members 2 of jack assembly 20 and a copper nut 5 is threadably engaged with the external threads on the tubular member 2. The copper washers 7 placed on each side of the printed circuit board assembly 30 insure good electrical contact between the jack assembly 20 and a printed circuit element 11 of the printed circuit board 30.

An integrated circuit temperature transducer 14, such as a Model AD590 Temperature Transducer manufactured by Analog Devices, which had previously been imbedded in faceplate 1, is now soldered to copper pads printed on circuit board assembly 30. Provisions are incorporated into printed circuit board assembly 30 to solder external leads to these connections such that the signals from the temperature transducer 14 can be led to external devices, such as the electronic circuitry 50 shown in FIGS. 5 and 6. Copper screws 15 are threadably engaged to the internal threads formed in the tubular member 2 of jack assembly 20. The thermocouple input leads 18 are wrapped around the copper screw 15 and the screws are tightened into the threaded opening of tubular member 2. The thermocouple signal, which is carried by thermocouple lead 18, is electrically transmitted to jack assembly 20 by the combination of copper screw 15 and the copper tubular member 2 of jack assembly 20. The signal is transmitted from jack assembly 20 by the copper nut 5 and copper washer 7 to the copper printed element 11 on the printed circuit board 30. Printed circuit element 11 transmits the signal to the copper connectors 12. When mating insulator block 16 and female connector 17 are inserted into the insulator block 13 and connectors 12 on printed circuit board 30, the signal can be led to external devices, such as the microprocessor circuitry 60 shown in FIGS. 5 and 7. All connections, terminations and leads in this invention, except for the input thermocouple leads, are copper. No thermoelectric effect takes place between common metals so that the only thermoelectric effect other than at the thermocouple junction occurs at the termination to the isothermal blocks.

Figure 6:
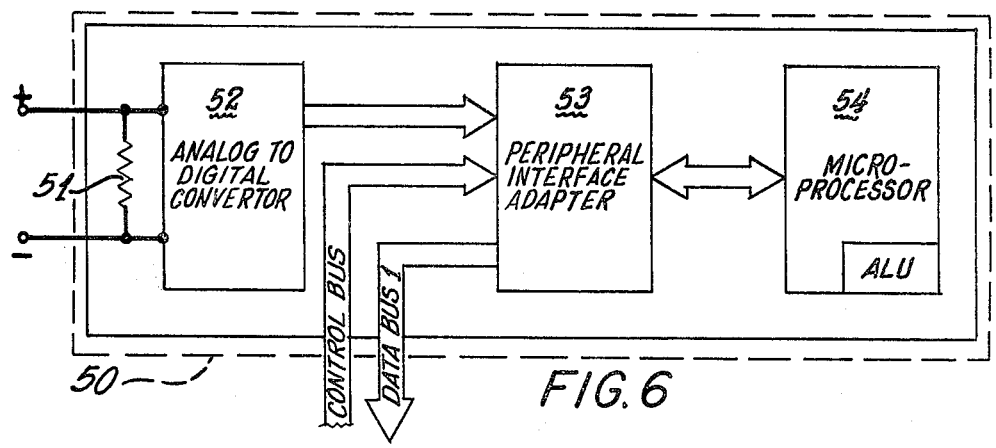
FIG. 6 is a block diagram of the circuitry to convert the analog signal from the integrated circuit temperature transducer into a digital temperature signal.
Figure 8:
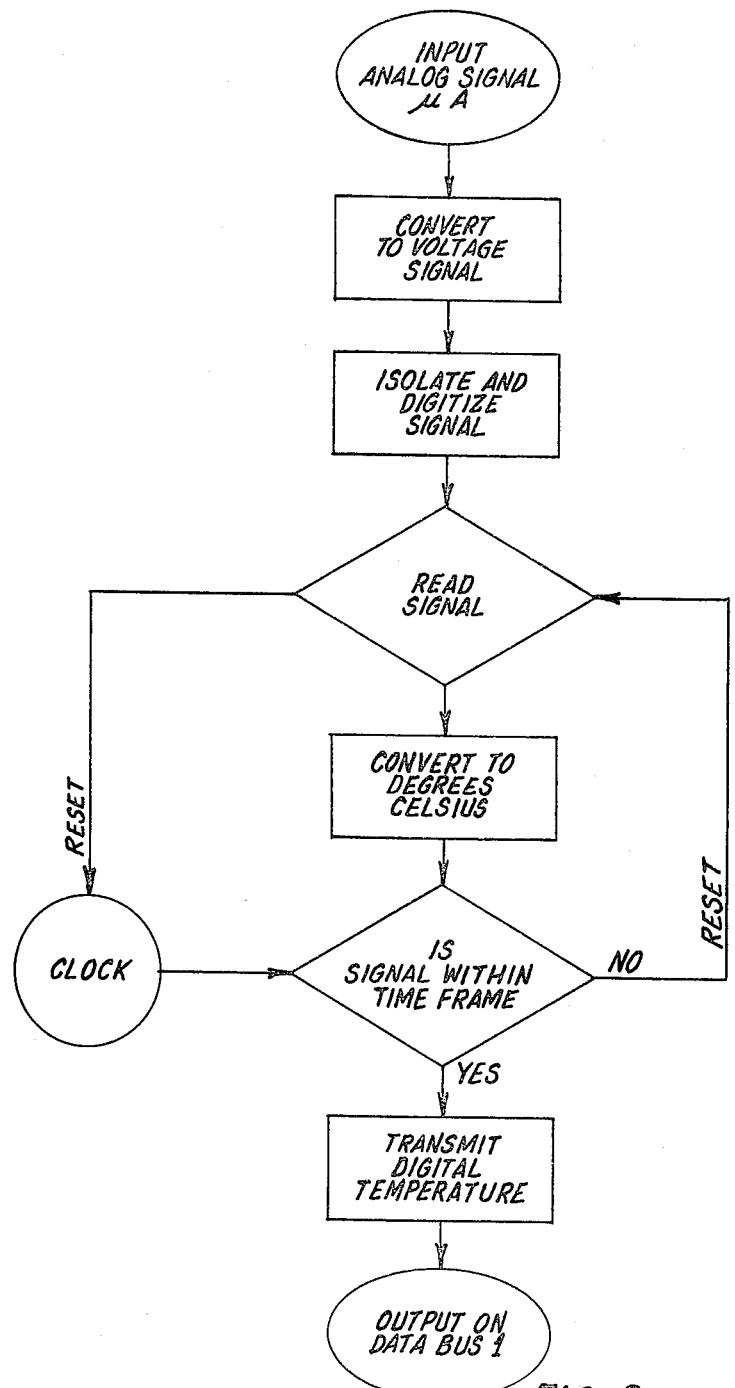
FIG. 8 is a logic diagram for converting the analog signal from the integrated circuit temperature transducer into a digital temperature signal.

Referring now to FIG. 5, the integrated circuit temperature transducer 14 which is embedded in the face plate 1 of isothermal block assembly 40 has its signal led from the printed circuit board assembly 30 to a microprocessor assembly 50. The input analog milliampere signal is dropped across a precision resistor 51 as shown in FIG. 6. An analog to digital converter 52 takes the voltage signal produced by resistor 51 and digitizes this signal. The signal is passed through a peripheral interface adapter 53 to a microprocessor 54. The signal at this point is a digital millivoltage signal proportional to the temperature in degrees Kelvin of the thermocouple with a reference junction at some temperature $t_1$, above zero degrees Celsius. The microprocessor, by means of its associated Arithmetic Logic unit, converts this signal into a digital signal representative of degrees Celsius, or first signal. This first signal is passed back through the peripheral interface adapter and placed on data bus 1. The control bus from the central computer 80 in FIG. 5 is used to control programming, clock functions and reprogramming of conversion algorithms whenever the integrated circuit temperature transducer 14 is changed or re-calibrated. FIG. 8 explains the logic that microprocessor assembly 50 performs. The signal is converted from microamperes to millivoltage. The signal is then digitized. An internal clock allows periodic update of the temperature of the isothermal block. The more rapidly the isothermal block temperature changes, the more frequently will the information be updated. The rate that the temperature of the isothermal is sampled is controlled by the central computer 80.

Referring back to FIG. 5, the individual thermocouple leads TC1 through TC18 are terminated to their own connectors item 20. These connectors are held at a stabilized temperature by the mass of metal which forms the face plate 1 of the isothermal block assembly 40. The thermocouple signals are led by the printed circuit board assembly 30 to connectors 13 which are attached to the printed circuit board assembly 30. Locking connector assemblies 16 transfer the thermocouple signal to microprocessor 60. There is a microprocessor 60 for each thermocouple lead TC1 through TC18.

Figure 7:
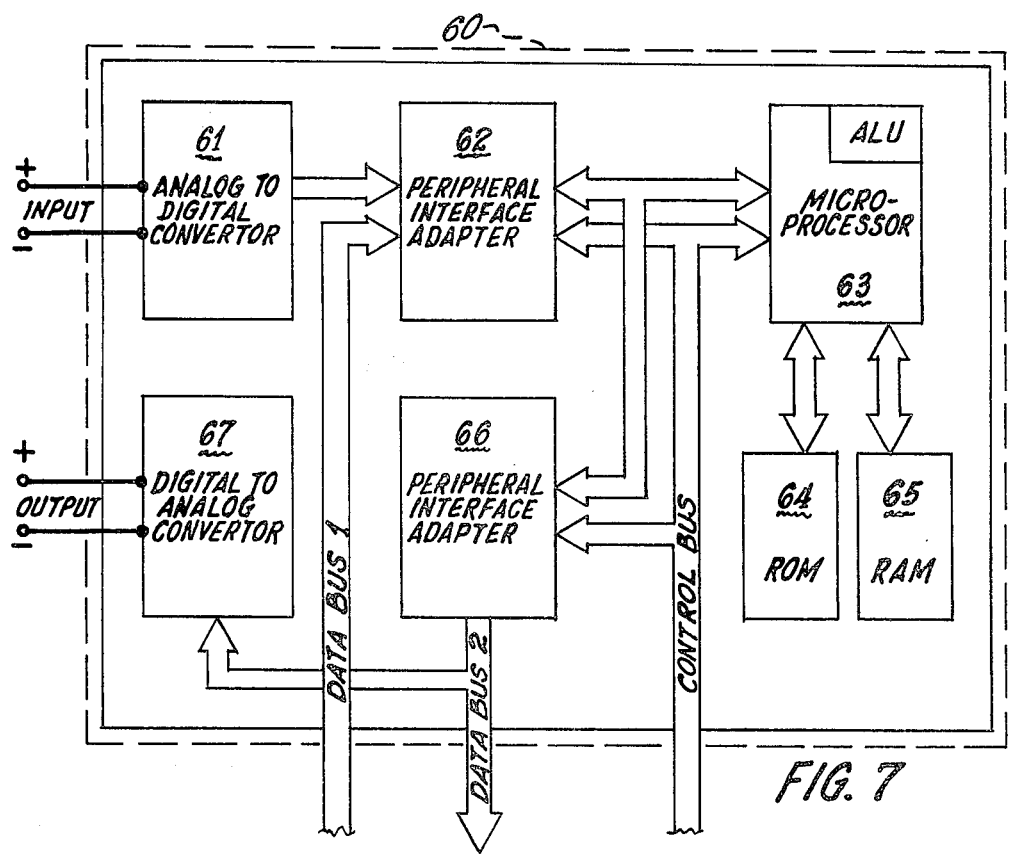
FIG. 7 is a block diagram of the circuitry used to compensate the thermocouple signal by use of the digital temperature of the isothermal block.

Microprocessor assembly 60, as shown in FIG. 7, accepts the thermocouple input signal into an analog to digital converter 61 which isolates the signal and converts the analog millivoltage signal into a digital signal. This digital signal is conditioned by a peripheral interface adapter 62 and then sent by an internal data bus to the microprocessor 63. Peripheral interface adapter 62 also accepts the first signal from data bus 1 and passes this on to microprocessor 63 by means of the internal data bus. Microprocessor 63 has an Arithmetic Logic Unit (ALU) and memories such as Read Only Memory (ROM) 64 and Random Access Memory (RAM) 65 associated with microprocessor 63 for storing information, instructions and programs. A control bus from the central computer is connected to microprocessor 63 to communicate the program, constants and formulae by which microprocessor 63 performs its functions.

Microprocessor 63 uses one of two methods for compensating the thermocouple signal for the temperature of the reference junction. The specific method is dependent upon the software programming from the central computer. The first method which may be used is based upon an equation:

$$E = At + \frac{Bt^2}{2} + \frac{Ct^3}{3}$$

where:
  E=electromotive force generated by the thermocouple.
  t=temperature in degrees Celsius.
  A,B,C,=constants dependent upon the two metals used in the thermocouple construction.

This equation is the general form of the Seebeck effect produced by a thermocouple and assumes a reference junction temperature of zero degrees Celsius. When the reference junction is at some temperature other than zero degrees Celsius, a correction factor must be added in order to determine the true temperature of the thermocouple.

$$Ec = Eu + Erj$$

where:
  Ec=corrected millivoltage.
  Eu=uncorrected millivoltage.
  Erj=correction factor.

The central computer 80 loads constants A, B, C and a program into microprocessor 63. The microprocessor 63 reads the first digital signal which is the digitized temperature of the isothermal block which is on data bus 1. The microprocessor by means of the equation $$E = At + \frac{Bt^2}{2} + \frac{Ct^3}{3}$$

calculates a millivoltage Erj which is representative of the millivoltage produced by a thermocouple at the temperature of the reference junction which is the temperature of the isothermal block. The microprocessor then reads the digitized millivoltage signal from the thermocouple Eu. These two millivoltage signals are added to produce a corrected millivoltage signal Ec. The microprocessor then solves the cubic equation $$E_c = At + \frac{Bt^2}{2} + \frac{Ct^3}{3}$$

for t. This is the temperature of the thermocouple junction.

The second method which may be used by microprocessor 63 relies upon the central computer 80 loading look-up tables into the memories associated with microprocessor 63. The tables are conversions of millivoltage versus temperature for the particular type of thermocouples being used. The central computer feeds a table of millivoltage versus temperature to the microprocessor by means of the control bus. The microprocessor stores this look-up table in its associated memory. The microprocessor reads the first digital signal from the first data bus. This first digitized signal is the temperature of the isothermal block $t_1$. The microprocessor then reads the second digital signal which is the digitized millivoltage signal from the peripheral interface adapter 62 and represents the digitized uncorrected thermocouple signal Eu. The microprocessor begins looking in the look-up table at temperature $t_1$ which has a millivoltage $Et_1$ associated with it. The microprocessor then uses Eu as a change in millivoltage E until it finds a millivoltage associated with a temperature $t_2$ such that:

$$Eu = E = Et_2 - Et_1$$

This temperature $t_2$ is then the corrected temperature of the thermocouple junction. The digitized temperature signal $t_2$ now becomes the third digital signal. This third signal is passed to peripheral interface adapter 66 where it is placed on data bus 2 and simultaneously transmitted to a digital to analog converter 67. The digital to analog converter 67 converts the digital temperature signal back into an analog signal.

Figure 9:
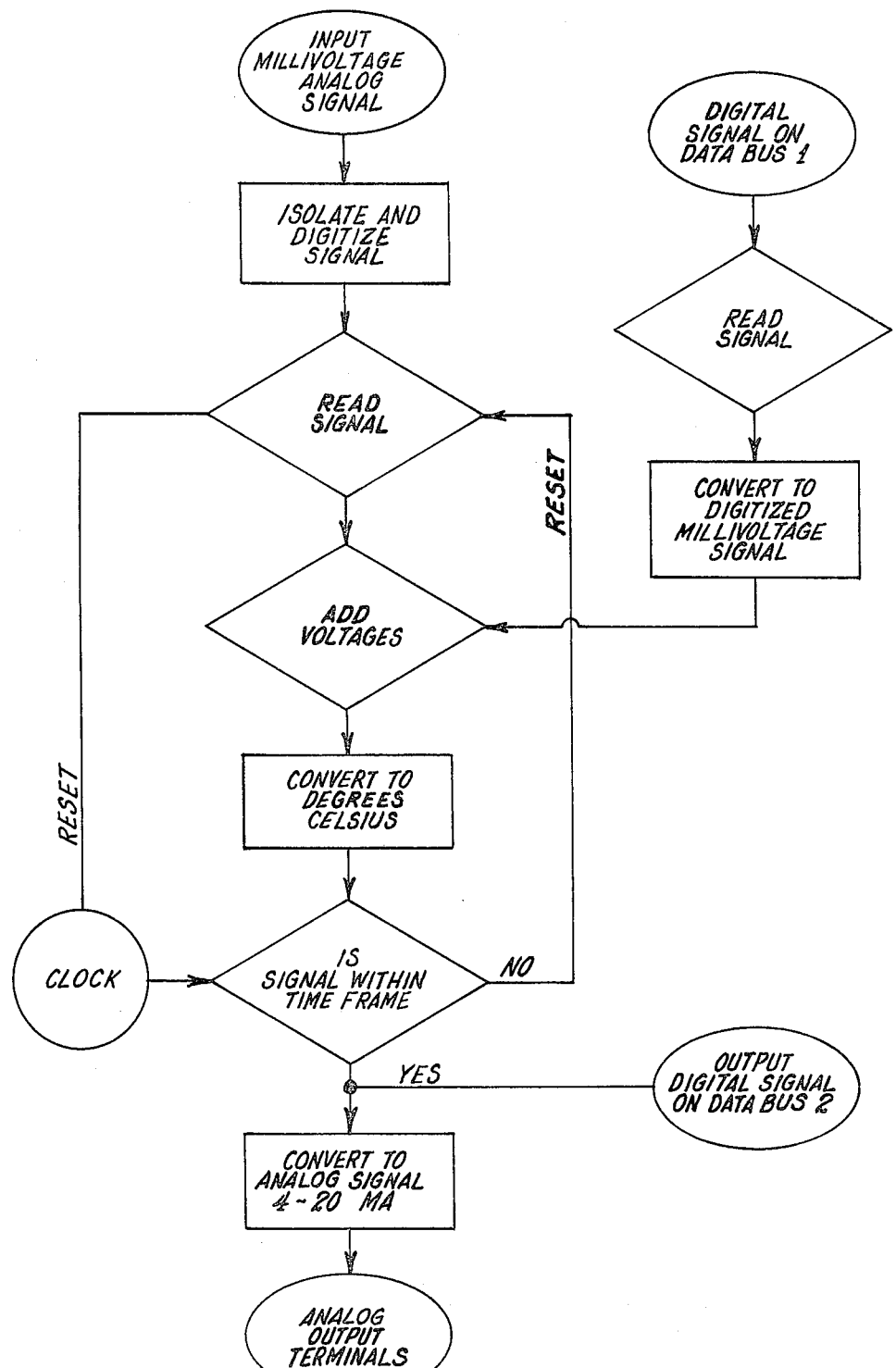
FIG. 9 is a logic diagram for compensating the analog thermocouple signal by use of the digital temperature of the isothermal block.

FIG. 9 shows in block diagram form the logic sequence that microprocessor 63 follows in processing the signal by method 1 described above. The input signal from the thermocouple is isolated and digitized. The microprocessor reads this signal and begins an internal clock running. The microprocessor reads the first digital signal, converts this into a millivoltage correction signal and adds this to the thermocouple signal. The combined signal is converted into a corrected temperature signal. The clock's time span is controlled by the central computer so that the signals are re-read periodically. If the signal is produced within the time span, then it is transmitted; otherwise the signal is re-read and the information is updated.

INDUSTRIAL APPLICABILITY

This invention allows a plurality of thermocouples to be compensated for the temperature of their reference junctions simultaneously. A single integrated circuit temperature transducer, which reads the temperature of an isothermal block which is maintaining all thermocouple reference junctions at the same temperature, produces a signal which through the use of microprocessors can form the basis of simultaneous compensation.

While the invention has been particularly shown and described with reference to preferred embodiment thereof, it will be understood by those skilled in the art that the foregoing and other changes in form and details may be made therein without departing from the spirit and scope of the invention.

We claim:

1. A method for simultaneous reference junction compensation of a plurality of thermocouple signals comprising the steps of:
   (a) terminating the thermocouple leads to jack assemblies, constructed of a material, different than the thermocouple leads which are electrically isolated, but thermally conductive to a metallic facepanel in which an integrated temperature transducer has been embedded;
   (b) feeding the signal from the integrated circuit temperature transducer to an analog to digital converter which converts the signal from the integrated circuit temperature transducer into a digital signal;
   (c) converting the digital signal with a microprocessor into a digital first signal which is representative of the temperature of the metallic facepanel;
   (d) impressing the digital first signal from the microprocessor with a peripheral interface adapter upon a first data bus;
   (e) feeding the thermocouple signals from the jack assemblies to an individual analog to digital converter for each thermocouple signal by a signal path that is composed of the same material as the jack assemblies;
   (f) isolating, and digitizing the thermocouple signal with the analog to digital converter to form a digital thermocouple signal;
   (g) converting the digital thermocouple signal into a second digital signal representative of an uncorrected temperature with the microprocessor;
   (h) reading the first digital signal from the first data bus by the microprocessor associated with the thermocouple signal;
   (i) combining the first digital signal with the second digital signal with the microprocessor to produce a third digital signal representative of the corrected temperature sensed by the thermocouple;
   (j) transmitting the third digital signal onto a second data bus by a peripheral interface adapter;
   (k) converting the third digital signal into an output signal with a digital to analog converter; and
   (l) transmitting the signal from the digital to analog converter to external field devices.

2. A method of simultaneous reference junction compensation of a plurality of thermocouple signals comprising the steps of:
   (a) terminating a plurality of thermocouple leads to a plurality of jack assemblies, said jack assemblies interconnecting in spaced apart relationship a metallic facepanel, electrically isolated from but thermally conductive to said jack assemblies and a printed circuit board electrically connected to said jack assemblies;

(b) providing a digital first signal by measuring the temperature of the metallic facepanel, said digital first signal representative of the temperature of the metallic facepanel and the jack assemblies;

(c) producing a plurality of digital second signals representative of the temperature of the individual thermocouples without reference junction temperature compensation; and (d) simultaneously adding the digital first signal to each of the individual digital second signals by means of a microprocessor associated with each thermocouple signal to produce a plurality of digital third signals, each said digital third signal representative of the individual thermocouple signals with reference junction temperature compensation, whereby the digital first signal is independent of the type of thermocouple which is associated with said digital second signals.

* * * * *